United States Patent [19]

Lanting

[11] Patent Number: 5,893,292
[45] Date of Patent: Apr. 13, 1999

[54] AUTOMATIC AND MANUAL SPLITTER SHIFTING CONTROL ASSEMBLY

[75] Inventor: Mark L. Lanting, Portage, Mich.

[73] Assignee: Eaton Corporation, Cleveland, Ohio

[*] Notice: This patent is subject to a terminal disclaimer.

[21] Appl. No.: 08/439,908

[22] Filed: May 12, 1995

[51] Int. Cl.[6] .................................................. F16H 61/18
[52] U.S. Cl. ............................................................. 74/335
[58] Field of Search ...................................... 74/335, 745

[56] References Cited

U.S. PATENT DOCUMENTS

| | | | |
|---|---|---|---|
| 4,722,248 | 2/1988 | Braun | 74/745 |
| 4,841,816 | 6/1989 | Bullock | 74/866 |
| 4,850,236 | 7/1989 | Braun | 74/337 |
| 4,974,468 | 12/1990 | Reynolds et al. | 74/477 |
| 5,038,627 | 8/1991 | Schwaiger et al. | 74/335 |
| 5,216,931 | 6/1993 | Hirsch et al. | 74/335 |
| 5,222,404 | 6/1993 | Stine | 74/335 |
| 5,224,392 | 7/1993 | Hutchison et al. | 74/335 |
| 5,329,826 | 7/1994 | Graves, Jr. et al. | 74/335 |
| 5,337,625 | 8/1994 | Jang | 74/335 |
| 5,435,212 | 7/1995 | Menig | 74/335 |

FOREIGN PATENT DOCUMENTS

| | | |
|---|---|---|
| 0037197 | 10/1981 | European Pat. Off. . |
| 0595496 | 5/1994 | European Pat. Off. . |

*Primary Examiner*—Dirk Wright
*Attorney, Agent, or Firm*—Howard D. Gordon

[57] ABSTRACT

A control valve assembly (94) is provided for allowing manual and automatic splitter shifting in a compound splitter-type vehicular transmission system (92). The control valve assembly is interposed in series between a selectively pressurized and exhausted conduit (108) controlled by a manual selector valve (104) and a pilot conduit (110) controlling the operation of a splitter shift actuator (86). The control valve assembly is designed to fail in a position allowing fluid communication between the selectively pressurized and exhausted conduit and the pilot conduit.

23 Claims, 7 Drawing Sheets

VALVE TABLE

| GEAR | S # 1 | S # 2 |
|---|---|---|
| 1 - 8 | OFF | OFF |
| 9 | ON | OFF |
| 10 | ON/OFF | ON |

AUTOMATIC AND MANUAL SPLITTER SHIFTING CONTROL ASSEMBLY

Related Applications

This application is related to allowed, co-pending U.S. Ser. No. 07/968,898 entitled SEMI-AUTOMATIC SHIFT IMPLEMENTATION and assigned to EATON CORPORATION, the assignee of this application now U.S. Pat. No. 5,435,212.

BACKGROUND OF THE INVENTION

1. Field of the Invention

The present invention relates to a control valve assembly for a splitter-type compound change-gear transmission allowing both manual and automated splitter shifting. In a preferred embodiment, the present invention relates to a control valve assembly for a vehicular partially automated splitter-type compound mechanical transmission system of the type requiring manual shifting in the lower ratios and having automatic splitter shifting in the upper two or more ratios.

2. Description of the Prior Art

Partially automated vehicular transmission systems requiring manual shifting in the lower ratios and having a control for automated shifting in the upper ratios are known in the prior art, as may be seen by reference to U.S. Pat. Nos. 4,722,248; 4,850,236 and 5,038,627, the disclosures of which are incorporated herein by reference.

Splitter and combined range and splitter-type compound vehicular transmissions requiring manual splitter shifting are well known in the prior art, as may be seen by reference to U.S. Pat. Nos. 3,799,002; 4,754,665; 4,974,468; 5,370,013 and 5,390,561, the disclosures of which are incorporated herein by reference.

SUMMARY OF THE INVENTION

In accordance with the present invention, a new and improved control valve assembly is provided which allows both manual and automatic splitter shifting in a splitter-type compound transmission and which, in the event of a failure in the valve assembly or in the power (usually electric) to the valve assembly will allow manual selection of all ratios.

The foregoing is accomplished by providing a control valve assembly to be interposed between the normal manually operated splitter selection valve and a 2-position pilot valve controlling the standard 2-position splitter piston/cylinder actuator assembly. In the preferred embodiment, the control valve assembly includes a first and a second 3-way, 2-position, solenoid-actuated valve. The first solenoid-actuated valve is normally open and will close when actuated to implement automatic-only splitter shifting by isolating and exhausting the selectively pressurized and exhausted conduit controlled by the manually operated selection valve from the actuator piston/cylinder assembly. The second solenoid-actuated valve is connected directly to a source of pressurized fluid and is normally open to connect the pilot valve to the outlet of the first solenoid-actuated valve and, in the actuated position, connects the pilot valve to the source of pressurized fluid. The pilot valve has a first default position for exhausting a chamber in the actuator piston assembly and a second position for connecting the chamber to the source of pressurized fluid.

In the event of an electrical power disruption, or if either one of the solenoids is sensed as defective, the valves will return to the open positions, allowing manual splitter shift selection for all ratios.

Accordingly, it is an object of the present invention to provide a new and improved control valve assembly to be interposed in series between a standard manual splitter shift selector and standard splitter actuator, selectively allowing manual and automated splitter shifting and designed to fail in a mode not interfering with manual splitter shifting selection.

This and other objects and advantages of the present invention will become apparent from a reading of the detailed description of the preferred embodiment taken in connection with the drawings.

BRIEF DESCRIPTION OF THE DRAWINGS

FIG. 4 is a valve table for the control valve assembly of the present invention, as utilized in the systems of FIGS. 3 and 3A.

DESCRIPTION OF THE PREFERRED EMBODIMENTS

Figure 1:
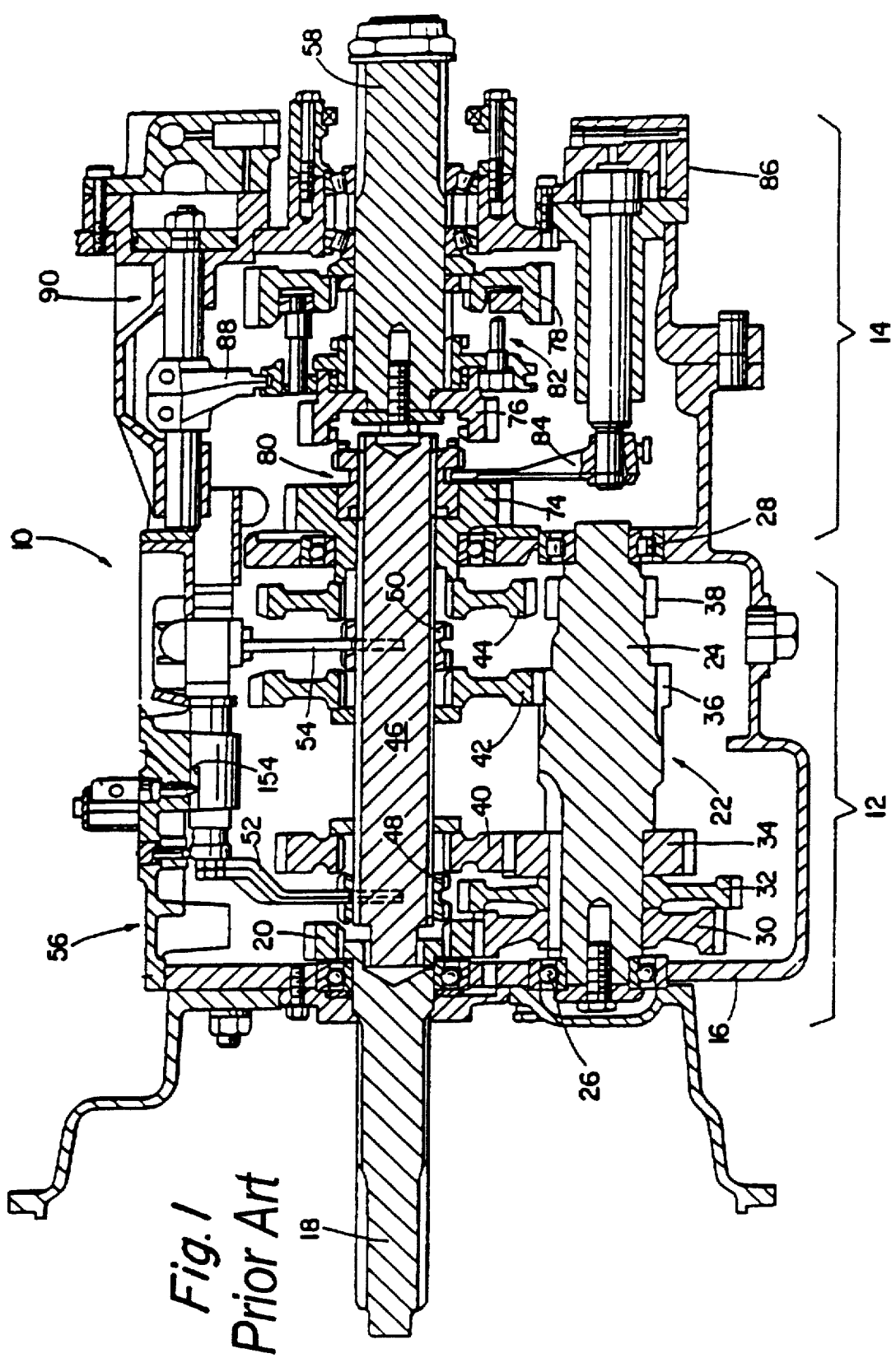
FIGS. 1 and 1A are sectional views of a typical splitter or combined splitter and range-type compound transmission.
Figure 1A:
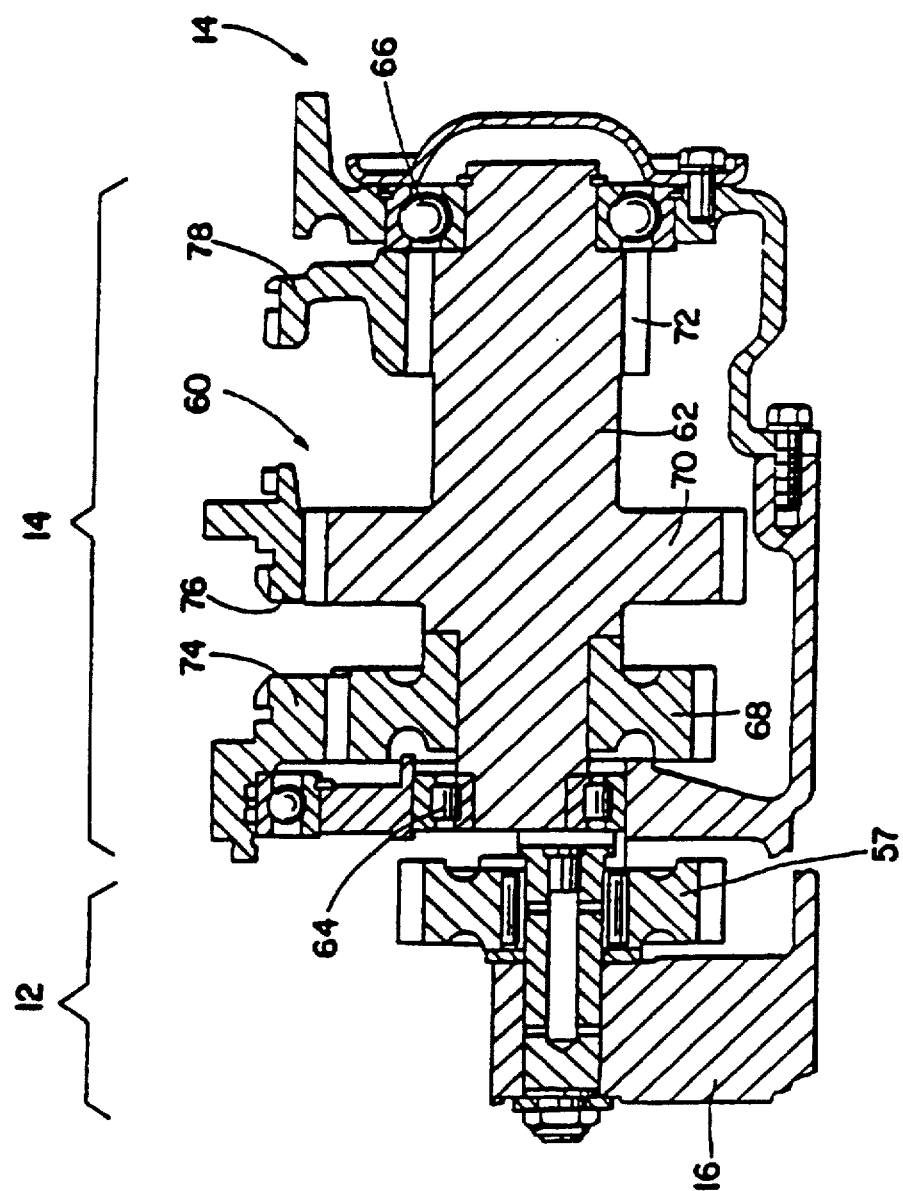
Figure 2:
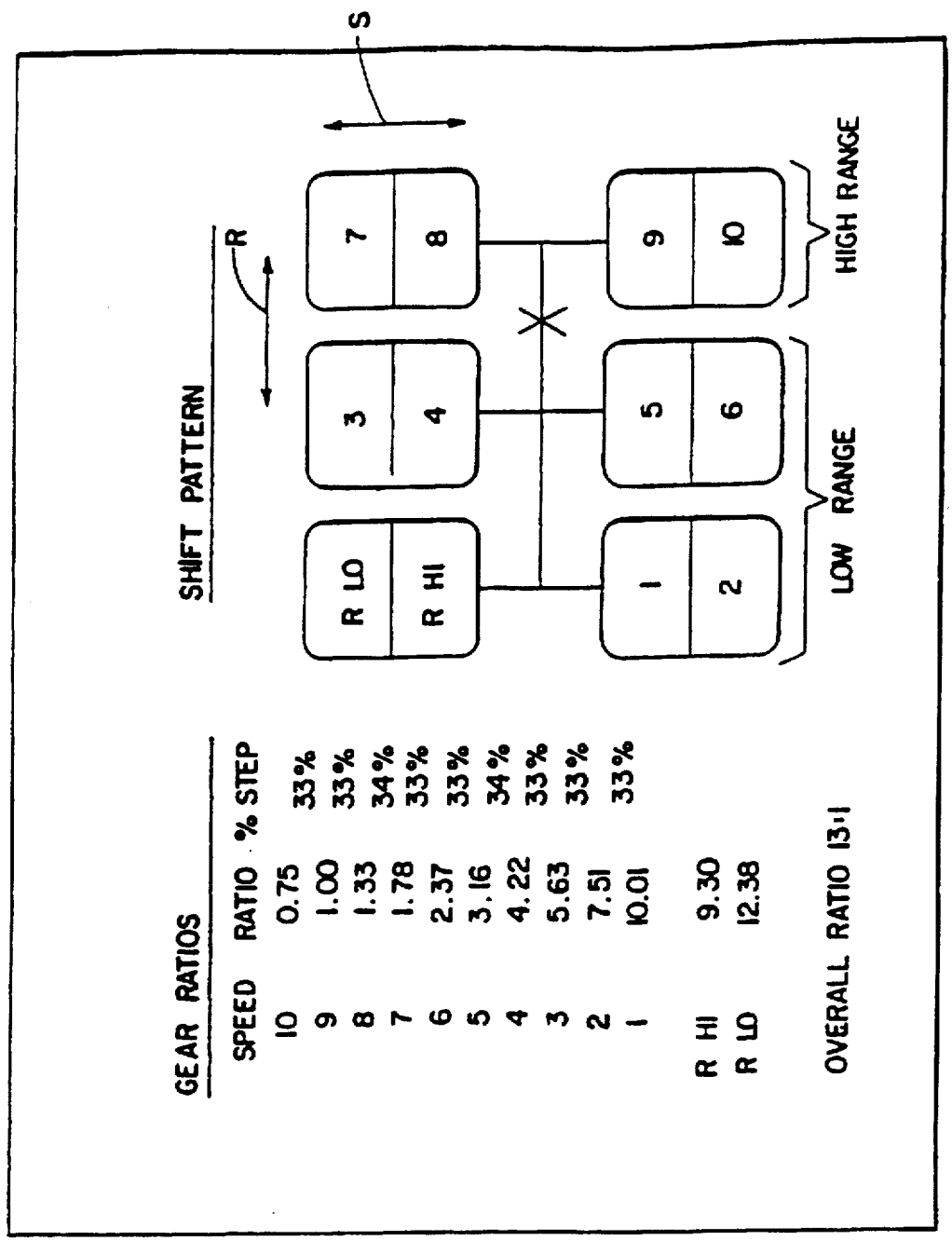
FIG. 2 is a schematic illustration of the manual shift pattern and ratio steps for the transmission of FIGS. 1 and 1A.

FIGS. 1, 1A and 2 illustrate a typical combined splitter and range-type compound mechanical transmission 10 of the type advantageously utilized in connection with the control valve assembly of the present invention.

Transmission 10 comprises a main transmission section 12 connected in series with an auxiliary transmission section 14 having both range and splitter type gearing. Typically, transmission 10 is housed within a single multipiece housing 16 and includes an input shaft 18 driven by a prime mover (such as a diesel engine) through a selectively disengaged, normally engaged friction master clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are hereby incorporated by reference, input gear 20 simultaneously drives a plurality of substantially identical mainsection countershaft assemblies at substantially identical rotational speeds. Each of the mainsection countershaft assemblies comprises a mainsection countershaft 24 supported by bearings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and are selectively clutchable, one at a time, to the mainshaft 46 for rotation therewith by sliding clutch collars 48 and 50 as is well known in the art. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56 to be described in greater detail below. Clutch collars 48 and 50 are, in the preferred embodiment, of the well-known non-synchronized, double-acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are 3-position clutches in that they may be positioned in a centered axially non-displaced, non-engaged position as illustrated or in a fully rightwardly engaged or fully leftwardly engaged position.

Auxiliary transmission section 14 is connected in series with main transmission section 12 and is of the 3-layer, 4-speed combined splitter/range type as illustrated in above-mentioned U.S. Pat. No. 4,754,665. Mainshaft 46 extends into the auxiliary section 14 and is journalled in the inward end of the output shaft 58 which extends from the rearward end of the transmission.

Auxiliary transmission section 14 includes, in the preferred embodiment thereof, a plurality of substantially identical auxiliary countershaft assemblies 60 (see FIG. 1A) each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner-end of mainshaft 46. Auxiliary section countershaft gears 72 constantly mesh with and support auxiliary section rangegear 78 which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range type auxiliary transmission section 14.

A sliding 2-position jaw clutch collar 80 is utilized to selectively couple either the splitter gear 74 or the splitter/range gear 76 to the mainshaft 46 while a 2-position synchronized clutch assembly 82 utilized to selectively couple the splitter/range gear 76 or the range gear 78 to the output shaft 58.

The splitter jaw clutch 80 is a 2-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a 2-position piston actuator 86 which normally is operable by a driver selection switch such as a button or the like on the shift knob, as is known in the prior art. Two-position synchronized clutch assembly 82 is also a 2-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a 2-position piston device 90, the actuation and control of which is described in greater detail in above-mentioned U.S. Pat. No. 4,974,468.

As may be seen by reference to FIGS. 1–2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a 3-layer auxiliary section of the combined range and splitter type providing four selectable speeds or drive ratios between the input (mainshaft 46) and output (output shaft 58) thereof. The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

While clutch 82 (the range clutch) should be a synchronized clutch, double-acting clutch collar 80 (the splitter clutch) is not required to be synchronized. The shift pattern for manually shifting transmission 10 is schematically illustrated in FIG. 2. Divisions in the vertical direction at each gear lever position signify splitter shifts while movement in the horizontal direction from the ¾ and ⅚ leg of the H pattern to the ⅞ and 9/10 leg of the H pattern signifies a shift from the low range to the high range of the transmission. As discussed above, manual splitter shifting is accomplished in the usual manner by means of a vehicle operator-actuated splitter button or the like, usually a button located at the shift lever knob while operation of the range clutch shifting assembly is an automatic response to movement of the gear shift lever between the central and rightwardmost legs of the shift pattern, as illustrated in FIG. 2. Range shift devices of this general type are known in the prior art and may be seen by reference to U.S. Pat. Nos. 3,429,202; 4,455,883; 4,561,325 and 4,663,725, the disclosures of which are incorporated herein by reference.

Figure 3:
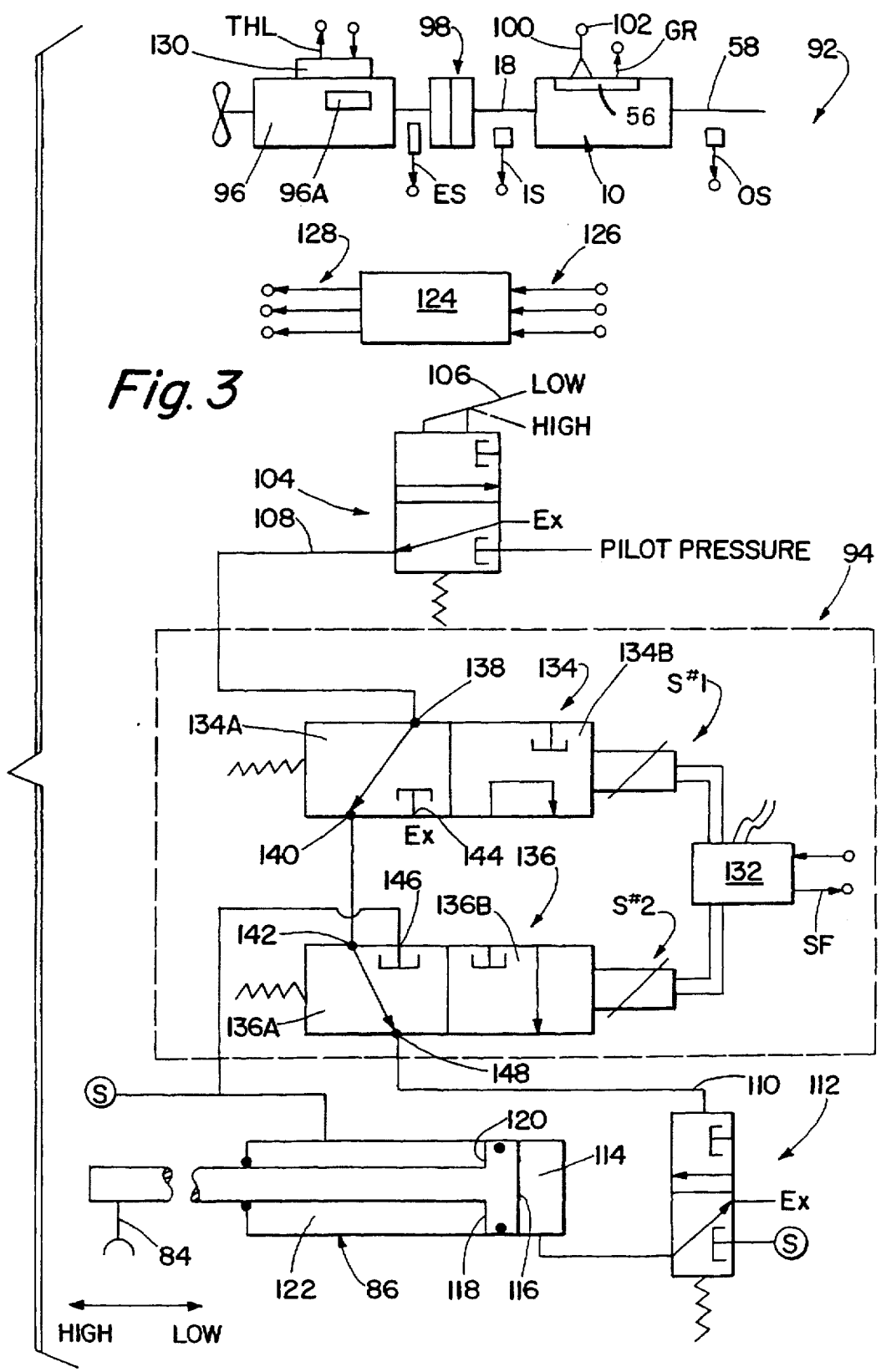
FIG. 3 is a schematic illustration of a partially automated vehicular mechanical transmission system having both manual and automatic splitter shifting and utilizing the control valve assembly of the present invention.
Figure 5:
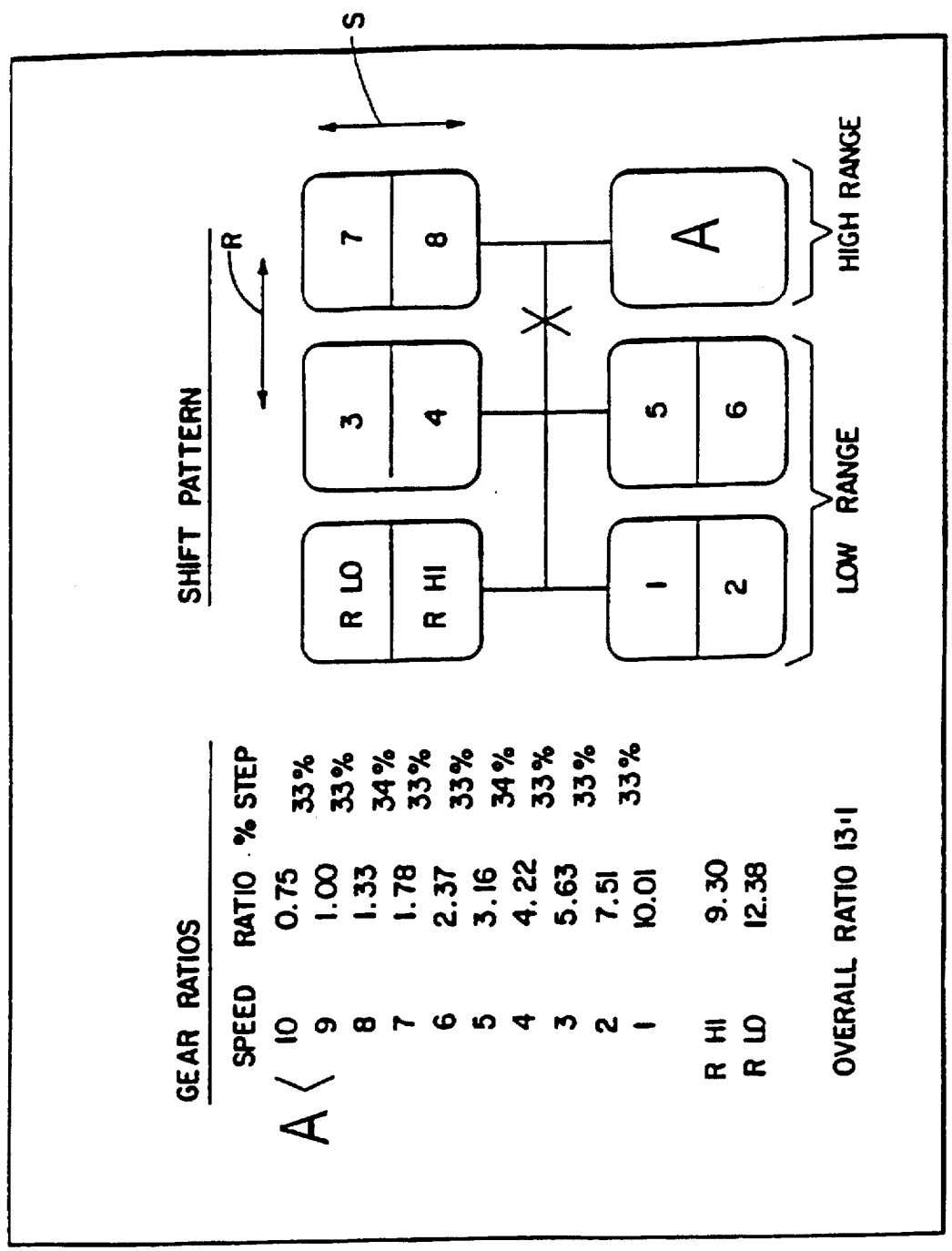
FIG. 5 is a schematic illustration, similar to FIG. 2, of the shift pattern and ratio steps for the transmission of the systems of FIGS. 3 and 3A.

A partially automated vehicular mechanical transmission system 92 utilizing the control valve assembly 94 of the present invention is illustrated in FIG. 3. Partially automated system 92 is of the type requiring manual shifting in the lower gear ratios (first through eighth) and providing automatic shifting in the upper gear ratios (ninth and tenth), as described in aforementioned U.S. Pat. Nos. 4,722,248; 4,850,236 and 5,038,027. The shift pattern for partially automated operation of the system 92 is schematically illustrated in FIG. 5.

The present invention also is applicable to systems having automatic splitter shifting in most or all shift lever positions, as described in aforementioned allowed U.S. Ser. No. 07/968,898, now U.S. Pat. No. 5,435,212, the disclosure of which is incorporated herein by reference, as well as the compound transmissions illustrated in aforementioned U.S. Pat. Nos. 4,754,665 and 5,370,013.

The system includes a prime mover, such as diesel engine 96, driving the input shaft 18 of transmission 10 through a master friction clutch 98. The transmission 10 includes a shift lever 100 having a shift knob 102, which is associated with the shift bar housing 56 for manually shifting main section 12 and the range clutch 82 of auxiliary section 14.

A manually operated splitter valve 104, having a selector lever or button 106, is provided, usually on or integral with the shift knob, for manually shifting the splitter clutch 80. Splitter valve 104 is a 2-position, 3-way manually operated valve effective to selectively connect a first pilot conduit 108 to exhaust ("$E_x$") or to pilot pressure, respectively, to manually select either the high or low splitter ratio. The pilot pressure may be equal to supply pressure ("S") or to a lower valve. In a typical onboard pneumatic system, supply is filtered, regulated air at about 60 psi.

The first pilot conduit 108 may fluidly communicate with a second pilot conduit 110 in series through the control valve assembly 94 of the present invention. The second pilot conduit 110 is effective to act on a 2-position, 3-way pilot valve 112, which is effective to normally vent or selectively pressurize a control chamber 114 of the splitter piston/cylinder actuator assembly 86. Chamber 114 is exposed to the larger area face 116 of a differential area piston 118 having a smaller area face 120 constantly exposed to supply pressure in biasing chamber 122. As is known, a spring may be utilized in place of or in combination with smaller area piston face 120 to bias piston 118 rightwardly, as seen in FIG. 3.

As may be seen, when pilot conduit 110 is exhausted, pilot valve 112 will connect control chamber 114 to exhaust, and supply pressure acting on smaller area face 120 will cause shift fork 84 to move splitter clutch 80 to engage gear 76 for the low splitter ratio, and when pilot conduit 110 is pressurized, valve 112 will move against a bias to a position for pressurizing control chamber 114, causing the piston 118 to move leftwardly to cause splitter clutch 80 to engage gear 74 for the high splitter ratio.

Except for interposing the control valve assembly 94 in series between pilot conduits 108 and 110, the above-described components are structurally and functionally equivalent, as utilized to shift the manually shifted transmission of FIGS. 1, 1A and 2.

To provide the partially automated operation of system 92, a controller 124, preferably a microprocessor-based controller, is provided for receiving input signals 126 and for processing same according to predetermined logic rules to issue command output signals 128 to various system actuators, such as an engine fuel control 130 and a solenoid driver and fault detection unit 132. Controllers of this type may be seen by reference to U.S. Pat. No. 4,595,986, the disclosure of which is incorporated herein by reference.

Sensors for sensing engine speed ES and output shaft speed OS may be provided, as well as sensors for sensing engine fueling THL and solenoid faults SF, all of which provide input signals indicative thereof to the controller 124.

As is known, the engine 96 may have a built-in controller 96A and/or may communicate with controller 124 by an electronic data link of the type conforming to SAE J-1922, SAE J-1939, ISO 11898 or the like.

The control valve assembly 94 of the present invention is interposed in series between the standard manual splitter shift selection valve 104 and the standard pilot valve 112/splitter actuator 86 and is operated in response to command output signals from controller 124. The assembly includes, in series, a first 2-position, 3-way solenoid-controlled valve 134 and a second 2-position, 3-way solenoid-controlled valve 136 and a solenoid driver and fault detection unit 132 operating in response to command output signals from the controller.

Valve 134 has an inlet 138 connected to pilot conduit 108 and two outlets 140 (connected to one inlet 142 of valve 136) and 144 (connected to exhaust). Valve 134 has a first normal or default position wherein inlet 138 is connected to outlet 140, and thus, inlet 142 of valve 136 and outlet 144 of valve 134 are blocked. Valve 134 has a second or actuated position upon energizing the first solenoid S#1 wherein outlet 140 is connected to exhaust at outlet 144 and inlet 138 is blocked.

Valve 136 has two inlets 142 (connected to the outlet 140 of valve 134) and 146 (connected to the source of pressurized fluid) and an outlet 148 connected to the second pilot conduit 110 controlling the pilot valve 112. Valve 1136 has a first normal or default position wherein inlet 142 is connected to outlet 148 and the inlet 146 from source pressure is blocked, and a second actuated position upon energizing the second solenoid S#2 wherein inlet 142 is blocked and source pressure at inlet 146 communicates with outlet 148 and pilot conduit 110.

The valve table for operation of the solenoid-operated valves is set forth in FIG. 4.

The controller 124 senses a manual splitter operation mode by sensing a shift bar condition GR other than AUTO (see FIG. 5). In this mode (i.e., gear ratios 1–8), the solenoid driver is commanded to de-energize both of the solenoids and the valves 134 and 136 will assume the default positions thereof. Pilot conduit 108 will communicate with pilot conduit 110 through the valves 134 and 136, and the actuator 86 will be under the manual control of selector valve 104.

Upon sensing a manual shift to the AUTO position, the controller will cause the solenoid driver 132 to energize the first solenoid S#1 to create an automatic-only splitter situation, as valve 134 moves to its second position wherein the pilot conduit 108 controlled by manual selector valve 104 is blocked at inlet 138, and thus, the series connection through port 140 to the pilot valve 112 is blocked. With valve 134 in the second or actuated position thereof, the manual selector 104 is ineffective to control pilot valve 112 or splitter actuator 86.

When in the AUTO mode of operation and based upon vehicle speed, as indicated by the output shaft speed OS and/or the other sensed parameters, the control 124 will automatically determine if an automatic upshift from ninth to tenth or an automatic downshift from tenth to ninth is required, and will control engine fueling and the second solenoid-controlled valve 136 to implement same. With valve 134 actuated and valve 136 in its normal or default position, pilot conduit 110 is exhausted at port 144 of valve 134, and pilot valve 112 will exhaust the control chamber 114 of the piston/cylinder assembly 86, causing the piston to urge the splitter clutch in the low splitter ratio direction. With the second solenoid-controlled valve 136 actuated, pilot conduit 110 is connected to source pressure through inlet 146 and outlet 148 of valve 136, regardless of the position of valve 134, and pilot valve 112 will cause control chamber 114 to be pressurized, causing the piston 118 to urge the splitter clutch in the high splitter ratio direction. Valve 134 may be deactivated whenever valve 136 is energized to reduce heat generation.

Upon an electrical power failure, the solenoid-controlled valves will return to the open positions thereof, fluidly connecting conduits 108 and 110, and allowing manual selection of all ten forward ratios. Upon the solenoid driver detecting conditions indicative of a failure at one or both solenoids, the controller will cause both solenoids to be de-energized again, causing the two valves 134 and 136 to assume the open positions thereof, and allow manual selection of all ten forward ratios.

The control valve assembly 94, thus, provides a control allowing both manual and automatic splitter shifting, provides a favorable failure mode and as a module requires only four additional fluid connections (conduit 108 to port 138, conduit 110 to port 148, source S to port 146 and exhaust $E_x$ to port 144) to the normally utilized manual splitter control.

Figure 3A:
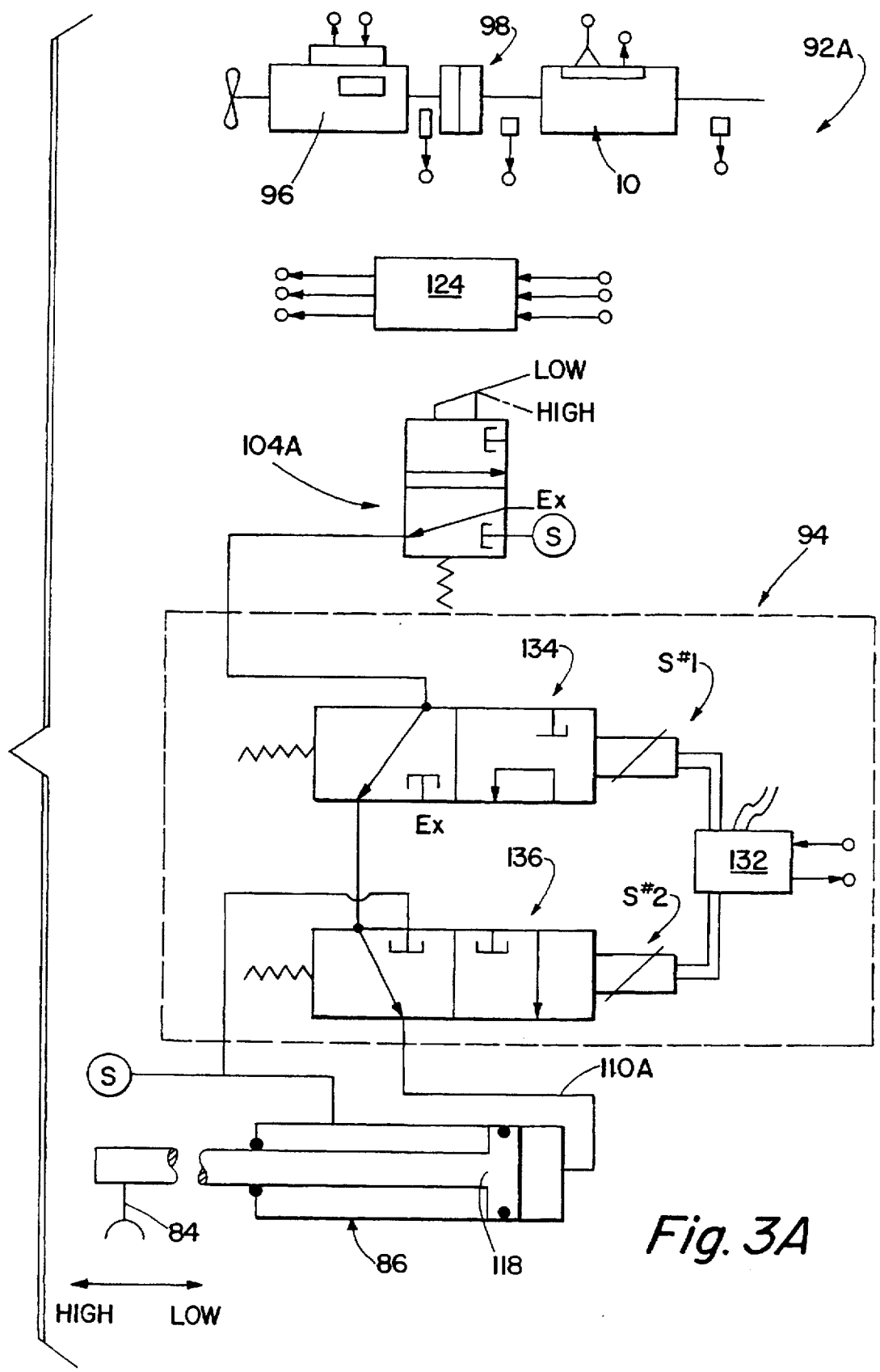
FIG. 3A is a schematic illustration of an alternate partially automated vehicular mechanical transmission system utilizing an alternate embodiment of the control valve assembly of the present invention.

An alternate transmission system 92A utilizing the control valve assembly 94 of the present invention is illustrated in FIG. 3A. System 92A differs from system 92 described above only in that the pilot valve 112 is not utilized, conduit 110A connects directly to chamber 114 of the actuator piston/cylinder assembly 86, and the manual control selector valve 104A is connected to source S, not a pilot pressure, which may differ from the source pressure. Other than as noted, system 92A is substantially structurally and functionally identical to system 92 described above.

Accordingly, it may be seen that an improved compound transmission and shift control unit has been provided.

The description of the preferred embodiment of the present invention is by way of example only, and various modifications and/or rearrangement of the parts are contemplated without departing from the spirit and the scope of the invention as hereinafter claimed.

We claim:

1. A control valve assembly (94) for controlling shifting in a vehicular change-gear transmission system (92) comprising a mechanical change-gear transmission (10), a first selectively pressurized and exhausted conduit (108), a manually controlled selector valve (104) for selectively pressurizing and exhausting said first conduit, a second selectively pressurized and exhausted conduit (110), a shift actuator (86) responsive to pressurization in said second conduit to move to a first position and responsive to exhaust of said second conduit to move to a second position, said control valve assembly (94) interposed in series between said first and second conduits and having a first condition (S#1=off; S#2=off) for fluidly communicating said first and second conduits and a second condition (S#1=on) for blocking fluid communication between said first and second conduits and selectively pressurizing (S#2=on) and exhausting (S#2=off) said second conduit independent of said manual selection valve.

2. The valve assembly of claim 1 wherein said transmission is a splitter-type compound transmission and said shift actuator is effective to engage first and second splitter ratios, respectively, in the first and second positions, respectively, thereof.

3. The valve assembly of claim 1 comprising first (134) and second (136) 2-position solenoid-controlled valves, said solenoid-controlled valves in the normal positions thereof causing said assembly to assume said first condition thereof.

4. The control valve assembly of claim 3 wherein said valve assembly further comprises a solenoid driver (132) for selectively energizing and de-energizing the solenoids (S#1, S#2) associated with said solenoid-controlled valves.

5. The control valve assembly of claim 3 wherein said first solenoid-controlled valve is a 2-position, 3-way valve having a first port (138) fluidly connected to said first conduit, a second port (140) fluidly connected to said second solenoid-controlled valve, and a third port (144) connected to an exhaust, said first solenoid-controlled valve having a normal first position (134A) wherein said first and second ports are in fluid communication and said third port is blocked and an energized second position (134B) wherein said first port is blocked and said second and third ports are in fluid communication, and said second solenoid-controlled valve is a 2-position, 3-way valve having a fourth port (142) fluidly connected to said second port, a fifth port (146) connected to a source of pressurized fluid and a sixth port (148) connected to said second conduit, said second solenoid-controlled valve having a normal first position (136A) wherein said fourth and sixth ports are in fluid communication and said fifth port is blocked and an energized second position (136B) wherein said fourth port is blocked an said fifth and sixth ports are in fluid communication.

6. The control valve assembly of claim 4 wherein said first solenoid-controlled valve is a 2-position, 3-way valve having a first port (138) fluidly connected to said first conduit, a second port (140) fluidly connected to said second solenoid-controlled valve, and a third port (144) connected to an exhaust, said first solenoid-controlled valve having a normal first position (134A) wherein said first and second ports are in fluid communication and said third port is blocked and an energized second position (134B) wherein said first port is blocked and said second and third ports are in fluid communication, and said second solenoid-controlled valve is a 2-position, 3-way valve having a fourth port (142) fluidly connected to said second port, a fifth port (146) connected to a source of pressurized fluid and a sixth port (148) connected to said second conduit, said second solenoid-controlled valve having a normal first position (136A) wherein said fourth and sixth ports are in fluid communication and said fifth port is blocked and an energized second position (136B) wherein said fourth port is blocked an said fifth and sixth ports are in fluid communication.

7. The valve assembly of claim 5 wherein said transmission is a splitter-type compound transmission and said shift actuator is effective to engage first and second splitter ratios, respectively, in the first and second positions, respectively, thereof.

8. A partially automated vehicular transmission system (92, 92A) comprising a splitter-type compound transmission (10), a splitter shift actuator (86) having first and second positions for engaging first and second splitter ratios, respectively, a controller (124) for receiving input signals (126) indicative of system operating conditions and for processing same in accordance with logic rules to issue command output signals to system actuator including a control valve assembly actuator (132), a first selectively pressurized and exhausted conduit (108), a manually controlled selector valve (104) for selectively pressurizing and exhausting said first conduit, a second selectively pressurized and exhausted conduit (110), said shift actuator (86) responsive to pressurization in said second conduit to move to said first position thereof and responsive to exhaust of said second conduit to move to said second position thereof, a control valve assembly (94) interposed in series between said first and second conduits, said control valve assembly controlled by said control valve assembly actuator and having a first condition (S#1=off; S#2=off) for fluidly communicating with said first and second conduits and a second condition (S#1=on) for blocking fluid communication between said first and second conduits and selectively pressurizing (S#2=on) and exhausting (S#2=off) said second conduit independent of said manual selection valve.

9. The transmission system of claim 8 wherein said control valve assembly comprises first (134) and second (136) 2-position solenoid-controlled valves, said solenoid-controlled valves in the normal positions thereof causing said assembly to assume said first condition thereof.

10. The transmission system of claim 9 wherein said control valve assembly actuator further comprises a solenoid driver (132) for selectively energizing and de-energizing the solenoids (S#1, S#2) associated with said solenoid-controlled valves.

11. The transmission system of claim 9 wherein said first solenoid-controlled valve is a 2-position, 3-way valve having a first port (138) fluidly connected to said first conduit, a second port (140) fluidly connected to said second solenoid-controlled valve, and a third port (144) connected to an exhaust, said first solenoid-controlled valve having a normal first position (134A) wherein said first and second ports are in fluid communication and said third port is blocked and an energized second position (134B) wherein said first port is blocked and said second and third ports are in fluid communication, and said second solenoid-controlled valve is a 2-position, 3-way valve having a fourth port (142) fluidly connected to said second port, a fifth port (146) connected to a source of pressurized fluid and a sixth port (148) connected to said second conduit, said solenoid-controlled valve having a normal first position (136A) wherein said fourth and sixth ports are in fluid communication and said fifth port is blocked and an energized second position (136B) wherein said fourth port is blocked an said fifth and sixth ports are in fluid communication.

12. The transmission system of claim 9 wherein said first solenoid-controlled valve is a 2-position, 3-way valve having a first port (138) fluidly connected to said first conduit, a second port (140) fluidly connected to said second solenoid-controlled valve, and a third port (144) connected to an exhaust, said first solenoid-controlled valve having a normal first position (134A) wherein said first and second ports are in fluid communication and said third port is blocked and an energized second position (134B) wherein said first port is blocked and said second and third ports are in fluid communication, and said second solenoid-controlled valve is a 2-position, 3-way valve having a fourth port (142) fluidly connected to said second port, a fifth port (146) connected to a source of pressurized fluid and a sixth port (148) connected to said second conduit, said solenoid-controlled valve having a normal first position (136A) wherein said fourth and sixth ports are in fluid communication and said fifth port is blocked and an energized second position (136B) wherein said fourth port is blocked an said fifth and sixth ports are in fluid communication.

13. The transmission system of claim 12 wherein said rules include rules for sensing selection of a manual splitter shifting mode (1st–8th) and of an automatic splitter shifting mode (9th–10th), said solenoid associated with said first solenoid-controlled valve de-energized in response to sensing selection of said manual splitter shifting mode and energized in response to sensing selection of said automatic splitter shifting mode.

14. The transmission system of claim 12 wherein said rules include rules for sensing a fault in either of the solenoids associated with said solenoid-controlled valves, both of said solenoids de-energized in response to sensing a fault in either of said solenoids.

15. The transmission system of claim 13 wherein said logic rules include rules, when operating in said automatic splitter shifting mode, for sensing a selection of a shift into said first or second splitter ratio, said second solenoid energized in response to sensing a selection of a shift into said first splitter ratio and de-energized in response to sensing a selection of a shift into said second splitter ratio.

16. The transmission system of claim 13 wherein said rules include rules for sensing a fault in either of the solenoids associated with said solenoid-controlled valves, both of said solenoids de-energized in response to sensing a fault in either of said solenoids.

17. The transmission system of claim 8 wherein said rules include rules for sensing selection of a manual splitter shifting mode and of an automatic splitter shifting mode.

18. A partially automated vehicular transmission system comprising a splitter-type compound transmission, a splitter shift actuator having first and second positions for engaging first and second splitter ratios, respectively, a controller for receiving input signals indicative of system operating conditions and for processing same in accordance with logic rules to issue command output signals to system actuators including a control assembly actuator, a first conduit having a first and a second state, a manually controlled selector for selectively causing said first conduit to have said first and second states, a second conduit having a first and a second state, said shift actuator responsive to said second conduit being in said first state to move to said first position thereof and responsive to said second conduit being in said second state to move to said second position thereof, a control assembly interposed in series between said first and second conduits, said control assembly controlled by said control assembly actuator and having a first condition for establishing communication between said first and second conduits, and a second condition for blocking communication between said first and second conduits and selectively causing said second conduit to have said first and second states independent of said manual selector.

19. The system of claim 18 wherein said first and second conduits are fluid conduits, said first state comprising pressurization of said conduits and said second state comprising exhaust of said conduits.

20. The transmission system of claim 18 wherein said rules include rules for sensing selection of a manual splitter shifting mode and of an automatic splitter shifting mode.

21. A partially automated vehicular transmission system comprising a compound transmission having a two-speed auxiliary section, an auxiliary section shift actuator having first and second positions for engaging first and second auxiliary section ratios, a controller for receiving input signals indicative of system operating conditions and for processing same in accordance with logic rules to issue command output signals to system actuators including a control assembly to issue command output signals to system actuators including a control assembly actuator, a first conduit having a first and a second state, a manually controlled selector for selectively causing said first conduit to have said first and second states, a second conduit having a first and a second state, said shift actuator responsive to said second conduit being in said first state to move to said first position thereof and responsive to said second conduit being in said second state to move to said second position thereof, a control assembly interposed in series between said first and second conduits, said control assembly controlled by said control assembly actuator and having a first condition for establishing communication between said first and second conduits, and a second condition for blocking communication between said first and second conduits and selectively causing said second conduit to have said first and second states independent of said manual selector.

22. The transmission system of claim 21 wherein said rules include rules for sensing selection of a manual auxiliary section shifting mode and of an automatic auxiliary section shifting mode.

23. A partially automated vehicular transmission system comprising a compound transmission having a two-speed auxiliary section, an auxiliary section shift actuator having first and second positions for engaging first and second auxiliary section ratios, respectively, a manually controlled selector having first and second states, a controller for receiving input signals indicative of system operating conditions and for processing same in accordance with logic rules, including logic rules for sensing selection of a manual auxiliary section shifting mode and of an automatic auxiliary section shifting mode, to issue command output signals to system actuators including a control assembly actuator, a control assembly interposed in series between said selector and controlled by said control assembly actuator and having a first condition wherein said shift actuator will assume said first position thereof in response to said selector being in said first state and said second position thereof in response to said selector being in said second state, and a second condition for causing said shift actuator to assume a selected one of said first and second positions thereof independent of the state of said selector.

* * * * *